Patented Feb. 13, 1951

2,541,148

UNITED STATES PATENT OFFICE 2,541,148

PROCESS FOR TREATING COATINGS OF POLYALLYL ESTERS OF SATURATED FATTY ACIDS AND RESULTING PRODUCTS

Franklin A. Bent, Berkeley, Calif., assignor to Shell Development Company, San Francisco, Calif., a corporation of Delaware No Drawing. Application November 6, 1946,
Serial No. 708,200

12 Claims. (Cl. 117—65)

This invention relates to a method for producing surface coatings on metals by treating a polyallyl ester film which has been coated on the surface of the metal. The treatment renders the film insoluble in organic solvents such as hydrocarbons so that a valuable surface coating over the metal is obtained.

Polyallyl esters of unsaturated fatty acids "dry" and are converted to an insoluble product upon being placed in contact with air either at normal atmospheric or elevated temperatures, especially when in the presence of metallic driers like lead, cobalt and/or manganese napthenate. This ability to dry and become insoluble in organic solvents is especially marked with polyallyl esters of fatty acids containing multiple unsaturation such as linoleic, eleomargic, or linolenic acids. However, polyallyl esters of acids containing only a single ethylenic double bond such as acrylic or oleic acids also become insoluble when contacted with air.

It is recognized in the art that these polyallyl esters of unsaturated fatty acids dry and become insoluble by some reaction mechanism which involves coupling of the molecules through the ethylenic double bond

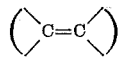

contained in the acyl radicals which are present in the polyallyl esters. It is known that so-called linear polymers are characterized by having the property of being soluble in organic solvents and this is true even though the polymer molecules are very large. However, if the soluble linear polymer has molecules containing more than one ethylenic double bond therein and the polymer is treated so that a cross-linking coupling reaction between the polymer molecules occurs, there is formed three dimensional molecules of complex structure which are incapable of dissolving in any organic solvent. For example, polyallyl oleate having an average degree of polymerization of 10 is a linear polymer which is soluble in organic solvents such as petroleum naphtha. The average molecule in this polyallyl oleate contains 10 ethylenic double bonds in the acyl radicals thereof so that when the ester is contacted with air, the coupling reaction causes cross-linking to occur with the result that a product of three dimensional molecular structure is formed and, consequently, this product is insoluble in the petroleum naphtha.

In contrast with polyallyl esters of unsaturated fatty acids which become insoluble by cross-linking of the linear polymer molecules, polyallyl esters of saturated fatty acids contain no ethylenic double bonds in the acyl radicals to provide the means through which cross-linking can occur and render the polymer insoluble. It is true that polyallyl esters of saturated fatty acids such as polyallyl laurate made by polymerizing monomeric allyl laurate may contain a single ethylenic double bond in each polymer molecule thereof. However, this ethylenic double bond is present as residual unsaturation in the carbon chain formed by coupling of the allyl radicals rather than in the lauric acyl radicals which are saturated. Furthermore, even if coupling could be made to occur through this residual ethylenic unsaturation contained in the carbon chain of the carbon chain of the polyallyl ester of a saturated fatty acid, which coupling or polymerization is extremely difficult or impossible to effect, the resulting product would still be of linear structure and soluble in organic solvents, as is the initial polyallyl ester owing to the fact that the polymer molecules of the initial polyallyl ester contain only a single ethylenic double bond therein rather than a plurality of such ethylenic linkages.

In view of the foregoing facts, it was surprising and unexpected to discover that when a film of a polyallyl ester of a saturated fatty acid is heated at about 210° C. while in contact with air, a product was formed which is insoluble in organic solvents. This treatment which constitutes the method of the invention provides a process whereby polyallyl esters of saturated fatty acids, which saturated fatty acids are considerably cheaper than the unsaturated acids, can be used to provide coatings on surfaces that are of great value in being resistant to attack by organic solvents because the resulting product in insoluble in such solvents. Furthermore, the treatment thermosets the polyallyl ester to a hard film, even though the initial polyallyl ester is liquid at normal atmospheric temperature.

In brief, the invention is a process for producing a converted surface coating from a poly(2-alkenyl) ester of a fatty acid wherein the acyl groups are saturated, contain at least two carbon atoms, and are at least four in number in the molecules of the polymeric ester which comprises heating a film of 0.0005 to 0.1 inch thickness of the poly(2-alkenyl) ester supported on a metal surface in an atmosphere containing oxygen at 200° C. to 450° C. for a time sufficient to render a major proportion of product insoluble in petroleum naphtha. The invention includes an article comprising a structure having thereon a coating comprising a converted film obtained by this process.

The temperature of the baking treatment is one important factor in converting the polyallyl ester of fatty acids to the insoluble product. The effect of temperature will be evident from the results given in Table I below which lists the per cent insoluble in petroleum naphtha of the resulting surface coatings obtained with the indicated polyallyl esters. The polymeric esters were coated onto one surface of mild steel plates and baked for one hour in an atmosphere of air at the noted temperatures. The time of one hour was such that the effect of temperature on the extent of insolubilization of the product could be followed. The coated plates after the baking treatment were placed in an apparatus which permitted petroleum naphtha to be boiled and condensed to the condensate would wash over the surface of the coating during a period of four hours. Before the treatment all of the polyallyl esters were soluble in the petroleum naphtha which was a paraffinic hydrocarbon having an A. P. I. gravity of about 68 and a boiling range of approximately 150° F. to 170° F.

*Table I*

| Temp., °C. | Polyallyl | | | |
|---|---|---|---|---|
| | Propionate | Caprylate | Pelargonate | Laurate |
| 150 | | 1 | | |
| 180 | 18 | 9 | 11 | 12 |
| 210 | | | | 43 |
| 240 | 64 | 60 | 69 | 77 |
| 270 | | 90 | | |
| 300 | | 97 | | 88 |
| 350 | 100 | 100 | 93 | |
| 400 | | | | 100 |
| 450 | | 100 | 100 | |

The results in the foregoing table show that at a temperature of about 200° C. an appreciable proportion of the product has become insoluble, i. e. at least one-third is insoluble in the naphtha, and that a majority of the product is insoluble at about 215° C. Furthermore, the effect of temperature is much more critical than is time. For example, baking polyallyl caprylate for one hour at 180° C. gave a product of which only 9% was insoluble in naphtha. If the rate of formation of insoluble product is uniform with time, it is evident that heating would have to be continued for more than eleven hours in order to obtain a completely insoluble product. On the other hand, by increasing the temperature only sixty degrees to 240° C., a completely insoluble product may be obtained in only an additional two-third's of an hour.

The polyallyl esters employed in coating the plates were viscous liquids at about 20° C. and were substantially free of the monomeric ester. They had been prepared by polymerizing the allyl ester of the saturated fatty acid and then removing unpolymerized monomer by distillation in vacuo. The acyl radicals in the polymers were saturated and the polymers contained only the residual ethylenic unsaturation in the carbon chain formed by the coupling of the allyl radicals, as will be evident from Table II below giving results of analysis of the polyallyl esters used in preparing the films described in Table I. In Table II the value for the molecular weight was determined ebulloscopically in toluene. From this determination the bromine number was calculated on the basis of one double bond per average polymer molecule. It will be noted that the bromine number actually found agrees closely with the calculated value.

*Table II*

| Polyallyl Ester | Mol. Weight | Polym. Degree | Br. No. Calc. From Mol. Wt. | Br. No. Found |
|---|---|---|---|---|
| Propionate | 590 | 5.2 | 27 | 26 |
| Caprylate | 810 | 4.4 | 20 | 21 |
| Pelargonate | 874 | 4.4 | 18 | 20 |
| Laurate | 1,042 | 4.3 | 15 | 16 |

Another important factor in converting the polyallyl esters of the saturated fatty acids to the insoluble product is effecting the baking treatment in an atmosphere containing molecular oxygen such as air. This will be apparent from the results given in Table III which lists the per cent of product insoluble in naphtha when polyallyl caprylate was placed as a film on metal plates and heated at the noted temperatures for one hour in an atmosphere of natural gas which consisted largely of methane and was substantially free of oxygen.

*Table III*

| Temp., °C. | Per cent Insoluble |
|---|---|
| 180 | 2 |
| 240 | 2 |
| 300 | 5 |

The foregoing results may be compared with those given in Table I. In the natural gas atmosphere only 2% of the product obtained from polyallyl caprylate at 240° C. was insoluble in the naphtha, while at the same temperature in an air atmosphere the percentage was 60. At 300° C. substantially all of the product obtained with an air atmosphere was insoluble, although only 5% was insoluble with the natural gas atmosphere.

According to the method of the invention a film consisting of a polyallyl ester of a saturated fatty acid is converted to an insoluble product by heating at about 200° C. to about 450° C. in an atmosphere containing molecular oxygen. A pure oxygen atmosphere may be used or one also containing inert gases like carbon dioxide, nitrogen or helium. In order that a surface coating will be obtained which is very resistant to the action of organic solvents such as naphtha, the heating is continued until substantially all of the product has become insoluble in such solvents, i. e. until at least about 90% has become insoluble. This will require about three hours' time at the lowest temperature of 200° C., rapidly decreases to about two hours' time at 210° C., and may be as short as 10–15 minutes at the highest temperature of 450° C. There is discoloration of the product at the upper portion of the temperature range where even black products are obtained and, although these dark products are not objectionable for some uses, it is ordinarily preferred to effect the conversion at about 210° C. to 300° C. In many cases, heating for time sufficient to convert a major proportion of the product to naphtha-insoluble materials is satisfactory since at this point the product will have thermoset to a solid material. This may be achieved in times about one-half as long as those necessary to convert to substantially insoluble product.

The method of the invention is applicable for use of polyallyl esters of any saturated acid provided the acid contains two or more carbon atoms. For example, there can be used such representative esters as polyallyl acetate, propionate, butyrate, isobutyrate, valerate, caproate, enanthate, caprylate, pelargonate, caprate, laurate, tridecanoate, myristate, palmitate, stearate, nondecanoate, arachidate, behenate, lignocerate, carnaubate, hyenate, cerotate or melissate. In forming the new products of the invention there is preferably used a polyallyl ester of a straight-chain saturated fatty acid containing at least 8 carbon atoms and most preferably one containing 8 to 18 carbon atoms. It is also preferred to employ the ester of a fatty acid which contains at least one hydrogen atom directly linked to the alpha carbon atom of the acid.

The polyallyl esters of saturated fatty acids treated according to the method of the invention have a degree of polymerization of at least 4, i. e. the polymers consist of molecules having at least 4 units of the allyl ester of the fatty acid joined by chemical bonding or, in other words, the molecular weight of the polyallyl esters is at least four times the molecular weight of the corresponding monomeric allyl esters. The degree of polymerization of the polyallyl ester may be any value of 4 or more, although it is preferred to employ polyallyl esters having a degree of polymerization of 4 to 20. The polyallyl ester of a saturated fatty acid used as a starting material in the method may be obtained by polymerizing the monomeric allyl ester by now known methods, e. g., heating in the presence of a peroxide polymerization catalyst. The product obtained by polymerizing the monomeric allyl ester always contains a substantial proportion of unpolymerized monomeric allyl ester, i. e. the final product of the polymerization is a mixture of 20% or more of monomeric allyl ester of the fatty acid, the remainder being the desired polyallyl ester which is soluble and is dissolved in the unpolymerized monomer. In order to obtain polyallyl ester of the saturated fatty acid in a condition suitable for use in the process of the invention, it is preferable to remove the unpolymerized monomer. This may be done by distilling, preferably in vacuo, the unpolymerized monomer from the mixture of monomer and polymer obtained by polymerizing the allyl ester although, if desired, a mixture of monomer and polymer of the allyl ester may be applied to a surface and the monomer evaporated therefrom to leave substantially monomer-free polymer for treatment according to the method of the invention. In order for the polyallyl ester of a saturated fatty acid to be converted to the insoluble product of the invention the polyallyl ester should be substantially free of the corresponding monomeric ester, i. e., contain less than say about 5% of the monomer. The nature of the change which occurs when the polyallyl ester is converted to the insoluble product is not understood, but it is known that the presence of any appreciable amount of the monomeric ester prevents formation of the desired insoluble product. Thus, when an allyl ester of a saturated fatty acid is heated above 200° C. in the presence of gaseous oxygen, formation of the polyallyl ester will occur but no products can be found which are insoluble in organic solvents including petroleum naphtha even though the polymerization is continued for sufficient time to convert more than the majority of the monomeric ester to soluble polymer. On the other hand, when substantially monomer-free polyallyl ester of a saturated fatty acid is heated as a film above 200° C. in an oxygen atmosphere, the insoluble product soon begins to form and a baked film is obtained in reasonable time with all or substantially all of it being insoluble in organic solvents like petroleum naphtha.

Instead of employing as starting material the polyallyl ester of a saturated fatty acid obtained by direct polymerization of the monomeric ester, it may be desirable to use polyallyl ester obtained by reacting the fatty acid with polyallyl alcohol. Such a starting product is obtained by heating polyallyl alcohol with a saturated fatty acid in the presence of an esterification catalyst like p-toluene sulfonic acid while distilling off the formed water of reaction with benzene, toluene or other azeotrope-forming agent in the usual manner for esterification reactions. Even though a stoichiometric excess of the fatty acid is employed, it is sometimes difficult to completely esterify the polyallyl alcohol. However, when the ester of a polyallyl alcohol contains at least four saturated acyl groups therein from the fatty acid, it is suitable for use in the invention although preferably more than about 20% of the hydroxyl groups are esterified and, most preferably the polyallyl alcohol is substantially completely esterified with the saturated fatty acid. The polyallyl alcohol used in the esterification has a degree of polymerization of 4 or higher, preferably 4 to 20, and thus contains at least 4 or more esterifiable hydroxyl groups, preferably 4 to 20 esterifiable hydroxyl groups.

It is ordinarily desirable to employ a polyallyl ester of a saturated fatty acid wherein all the acyl groups are the same, i. e. an ester from a single fatty acid. In order to obtain modified properties a polyallyl ester containing 2 or more different saturated fatty acyl groups may be employed. Such mixed esters are readily obtainable in several ways. A mixture of 2 or more allyl esters of different saturated fatty acids may be copolymerized. For example, allyl caprylate may be copolymerized with allyl laurate so as to obtain the copolymer polyallyl caprylate-laurate. Another method of preparing the mixed esters is to esterify polyallyl alcohol with a mixture of different saturated fatty acids. A further method is to subject a polyallyl ester of a lower fatty acid to acidolysis with a higher fatty acid. The last-mentioned method is described in detail below.

Equivalent amounts of polyallyl acetate and stearic acid were added to a still and heated in a carbon dioxide atmosphere to prevent contact with the oxygen in air while removing the liberated acetic acid as distillate. The starting quantities were about 52 parts by weight of polyallyl acetate (average degree of polymerization of 9) and 148 parts of stearic acid. Heating was applied so that the reaction mixture reached about 285° C. in 75 minutes, at which temperature it was held for an additional 10 hours. During this time, distillate was collected amounting to about 75% of the acetic acid. The reaction mixture was then allowed to cool and subjected to distillation in vacuo at about 1 mm. pressure until the temperature reached 255° C. for removal of unreacted stearic acid. About 36.5 parts of distillate were collected. The formed polyallyl stearate-acetate was a wax-like solid which melted at 45–50° C. It was soluble in petroleum naphtha, as are the other polyallyl esters of saturated fatty acids. A film of the polyallyl stearate-acetate was applied to a metal panel and was baked in an air oven at about 210° C. After an hour's time the film had become tack-free although it could be scratched with a finger nail. In two hours the converted film on the panel was unscratchable. It was also found that baking separate panels with films of polyallyl acetate and polyallyl stearate spread thereon in air at 210° C., thermoset the polyallyl acetate to a solid material although the stearate ester remained somewhat fluid. After two hours at 210° C., cooled panels with polyallyl acetate or polyallyl stearate-acetate gave coatings which were hard and unscratchable with a finger nail. In all cases where the polymers were cured to unscratchable materials, the coatings were flexible and adherent even though hard.

The method of the invention provides a means for placing a hard solvent-resistant coating on surfaces such as those of metals and especially ferruginous metals. The cured coatings were not only insoluble in petroleum naphtha, but are insoluble in organic solvents in general including ketones like acetone or methyl ethyl ketone, esters like ethyl acetate or butyl acetate, alcohols like methyl alcohol or ethyl alcohol, aromatic hydrocarbons like benzene or toluene, halogenated hydrocarbons like carbontetrachloride, nitrohydrocarbons like nitropropane or nitrobutane, and the like. The cured coatings are, of course, also insoluble in water.

The product of the invention in being insoluble and derivable from saturated fatty acids provides a valuable material for coating and covering objects such as metal containers and the like. In all cases the polyallyl ester is converted to the insoluble product in the form of a film. The applied film of the polyallyl ester for conversion by the method can be of varied thickness such as from about 0.0005 inch to about 0.1 inch. If desired, several successive films may be applied to a surface with curing after each application of the polyallyl ester. In general, the polyallyl esters employed as starting materials are liquids and may be applied as such to the surface. In some cases, it may be desirable to form the film by dissolving the polyallyl ester in a solvent such as petroleum naphtha and applying the solution to the surface in the same manner as a lacquer is applied. Ordinarily, the film to be treated consists solely of the polyallyl ester of the saturated fatty acid. In some cases, it may be desirable to incorporate other materials therein such as mica or pigments like titanium dioxide, red lead, iron oxide, carbon black, lead chromate, etc.

The method of the invention and the products therefrom have been described with particular reference to polyallyl esters of fatty acids wherein the acyl groups are saturated. In order to obtain the insoluble product the polyallyl ester need contain no acyl groups having unsaturated aliphatic carbon-to-carbon linkages therein, i. e., ethylenic unsaturation, or acyl groups which are joined together by chemical bonding as is the case in esters from di- or polycarboxylic acids. The polyallyl ester of the saturated fatty acid used in the method has the acyl groups separated by five intervening carbon atoms in a chain which forms part of the polyallyl radical and the two terminal carbon atoms in that intervening chain are primary carbon atoms. Although it is preferred to employ polyallyl esters of saturated fatty acids, the corresponding fatty acid esters of other equivalent polymeric alcohols may be used such as the esters of polymers of unsaturated alcohols like methallyl alcohol, ethallyl alcohol, crotyl alcohol, tiglyl alcohol, angelyl alcohol, 2-hexenol, 2-heptenol, 2-octenol and the like. These poly(2-alkenyl) esters of saturated fatty acids preferably contain 2-alkenyl radicals of three (allyl) to ten (2-decenyl) carbon atoms. The poly(2-alkenyl) esters of saturated fatty acids having a degree of polymerization of at least 4, preferably 4 to 20, and containing at least 4 saturated fatty acyl groups therein are converted by the method to a product insoluble in petroleum naphtha by heating as a film at 200° C. to 450° C., preferably 210° C. to 300° C., in an atmosphere containing molecular oxygen.

I claim as my invention:

1. A process for producing a converted surface coating from a poly(2-alkenyl) ester of a fatty acid wherein the acyl groups are saturated, contain at least two carbon atoms, and are at least four in number in the molecules of the ester which comprises heating a film of 0.0005 to 0.1 inch thickness consisting of the poly(2-alkenyl) ester supported on a metal surface in an atmosphere containing oxygen at 200° C. to 450° C. for a time sufficient to render a major proportion of product insoluble in petroleum naphtha.

2. An article comprising a structure having thereon a coating comprising a converted film obtained by the process of claim 1.

3. A process for producing a converted surface coating from a polyallyl ester of a fatty acid wherein the acyl groups are saturated, contain at least two carbon atoms, and are at least four in number in the molecules of the ester supported on a metal surface which comprises heating a film of 0.0005 to 0.1 inch thickness consisting of the polyallyl ester in an atmosphere containing oxygen at 200° C. to 450° C. for a time sufficient to render a major proportion of the product insoluble in petroleum naphtha.

4. An article comprising a structure having thereon a coating comprising a converted film obtained by the process of claim 3.

5. A process for producing a converted surface coating from a polyallyl ester of a saturated, straight-chain, fatty acid wherein the acyl groups are saturated and contain at least two carbon atoms, and the polyallyl ester has a degree of polymerization of 4 to 20 which comprises heating a film of 0.0005 to 0.1 inch thickness consisting of the polyallyl ester supported on a metal surface in an oxygen-containing atmosphere at 210° C. to 300° C. for a time sufficient to render substantially all of the converted film insoluble in petroleum naphtha.

6. An article comprising a structure having thereon a coating comprising a converted film obtained by the process of claim 5.

7. A process for producing a converted surface coating which comprises heating a film of 0.0005 to 0.1 inch thickness consisting of polyallyl acetate, having a degree of polymerization of 4 to 20, in an atmosphere of oxygen at 210° C. to 300° C. for a time sufficient to render substantially all of the converted film insoluble in petroleum naphtha, said film being supported on a ferruginous metal surface.

8. An article comprising a structure having thereon a coating comprising a converted film obtained by the process of claim 7.

9. A process for producing a converted surface coating which comprises heating a film of 0.0005 to 0.1 inch thickness consisting of polyallyl laurate, having a degree of polymerization of 4 to 30, in an atmosphere of oxygen at 210° C. to 300° C. for a time sufficient to render substantially all of the converted film insoluble in petroleum naphtha, said film being supported on a ferruginous metal surface.

10. An article comprising a structure having thereon a coating comprising a converted film obtained by the process of claim 9.

11. A process for producing a converted surface coating which comprises heating a film of 0.0005 to 0.1 inch thickness consisting of polyallyl acetate-stearate having an average degree of polymerization of about 9, in an atmosphere of air at about 210° C. for approximately two hours, said film being supported on a ferruginous metal surface.

12. A product obtained by the process of claim 11.

FRANKLIN A. BENT.

REFERENCES CITED

The following references are of record in the file of this patent:

UNITED STATES PATENTS

| Number | Name | Date |
|---|---|---|
| 2,374,081 | Dean | Apr. 17, 1945 |
| 2,376,504 | Pfann et al. | May 22, 1945 |